(12) United States Patent
Wybrow et al.

(10) Patent No.: US 6,706,996 B2
(45) Date of Patent: Mar. 16, 2004

(54) METHOD OF LASER DRILLING A HOLE

(75) Inventors: Michael N Wybrow, Nottingham (GB); Terence S Milward, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/247,734

(22) Filed: Sep. 20, 2002

(65) Prior Publication Data

US 2003/0066821 A1 Apr. 10, 2003

(30) Foreign Application Priority Data

Oct. 6, 2001 (GB) .............................. 0124054

(51) Int. Cl.⁷ .............................. B23K 26/38
(52) U.S. Cl. .............................. 219/121.71
(58) Field of Search .............. 219/121.71, 121.67, 219/121.68, 121.69, 121.7, 121.78, 121.79, 121.8; 29/889.721, 889.7, 889.71, 889.72

(56) References Cited

U.S. PATENT DOCUMENTS 5,223,692 A * 6/1993 Lozier et al. .......... 219/121.67
5,837,964 A * 11/1998 Emer et al. ............ 219/121.71
5,910,261 A 6/1999 Mori

FOREIGN PATENT DOCUMENTS

WO  WO 36221 A  7/1999

* cited by examiner

Primary Examiner—M. Alexandra Elve
Assistant Examiner—Jonathan Johnson
(74) Attorney, Agent, or Firm—W. Warren Taltavull; Manelli Denison & Selter PLLC

(57) ABSTRACT

A method of producing an angled hole 14 in a workpiece 10 includes the steps of: using a laser beam to produce an initial orifice in the workpiece 10; translating the laser beam away from the initial orifice to a starting point at a periphery of the hole 14 to be produced; and moving the laser beam such that it traces an elliptical path on the surface of the workpiece, thus defining the periphery of the hole 14, whilst maintaining the focus of the laser beam on the workpiece surface. The starting point is located in a region of the edge of the angled hole which meets the surface of the workpiece at an obtuse angle.

7 Claims, 3 Drawing Sheets

METHOD OF LASER DRILLING A HOLE

The present invention relates to a method of laser drilling a hole in a workpiece, for example a film cooling hole in a combustor component or a turbine blade or vane.

It is known to provide film cooling of various components of gas turbine engines which are exposed to extreme heat. Such components include the elements which make up the combustion chamber and the turbine rotor blades and nozzle guide vanes, which are situated directly downstream of the combustion chamber. The components to be cooled are generally provided with film cooling (effusion) holes arranged in rows such that streams of cooling air may emerge from the holes onto the surfaces of the components. The resulting films of air form barriers against the hot gases and prevent them from melting the components. The effusion holes may be angled obliquely relative to the surfaces of the components, this tending to produce a relatively smooth film of air.

It is known to form effusion holes in gas turbine engine components by laser drilling. Laser drilling involves the use of a laser machine tool to focus a beam of high-energy coherent radiation (laser light) on to the workpiece surface, hence causing material to be vaporised and expelled. Laser drilling has two variants: trepanning and percussion drilling, and this invention relates particularly to trepanning.

In trepanning, a continuous or pulsed laser beam is focused generally on the surface of the workpiece to drill through the workpiece at one point. The laser beam is subsequently moved through a circular path to cut the circumference of a cylindrical hole. Laser trepanning is used to drill holes with diameters greater than about 0.3 mm. Laser trepanning produces a more consistent and a better quality hole than percussion laser drilling, but is slower.

It is known to provide gas turbine engine components with thermal barrier coatings to enable the components to operate at high temperatures or to operate at conventional temperatures for longer periods. However, such coatings can make the laser drilling of cooling holes more difficult.

Attempts to increase the rate of laser drilling of angled effusion holes in combustor components have involved increasing the pulse energy of the laser and the feed rate. However, it has been found that this may cause the thermal barrier coating to delaminate.

According to the invention there is provided a method of producing an angled hole in a workpiece using a laser beam, the workpiece comprising a surface, the surface defines an angled hole, the angled hole having a first edge region and an opposite edge region, the first edge region of the angled hole meeting a surface of the workpiece at an obtuse angle and the opposite edge region of the angled hole meeting the surface of the workpiece at an acute angle, the method including the steps of: using the laser beam to drill an initial orifice in the workpiece; translating the laser beam away from the initial orifice to a starting point at a periphery of the hole to be produced; and moving the laser beam such that it traces a closed loop path on the surface of the workpiece, thus defining the periphery of the hole, whilst maintaining the focus of the laser substantially on the surface of the workpiece; wherein the starting point is located in the edge region of the angled hole which meets the surface of the workpiece at an obtuse angle.

Preferably the closed loop is traced so as to surround the initial orifice.

Preferably the closed loop path is elliptical.

Preferably wherein the laser beam is angled obliquely relative to the surface of the workpiece.

Preferably the laser beam is oriented at substantially the same angle as the hole to be produced.

Preferably the laser beam is guided through a laser nozzle which is movable to control the position and/or focus of the laser beam. Preferably the laser nozzle comprises a tip and a central axis, the movement of the nozzle is controlled with reference to three mutually perpendicular axes defined at the tip of the nozzle, one of the axes being parallel to the central axis of the hole to be produced and the other two axes defining a plane perpendicular to the hole to be produced, and wherein movement of the nozzle has a component consisting of a circle traced on the plane and a component consisting of variable movement along the axis perpendicular to the plane, thereby tracing an elliptical path substantially on the surface of the workpiece.

An embodiment of the invention will be described for the purpose of the illustration only with reference to the accompanying drawings in which.

Figure 1:
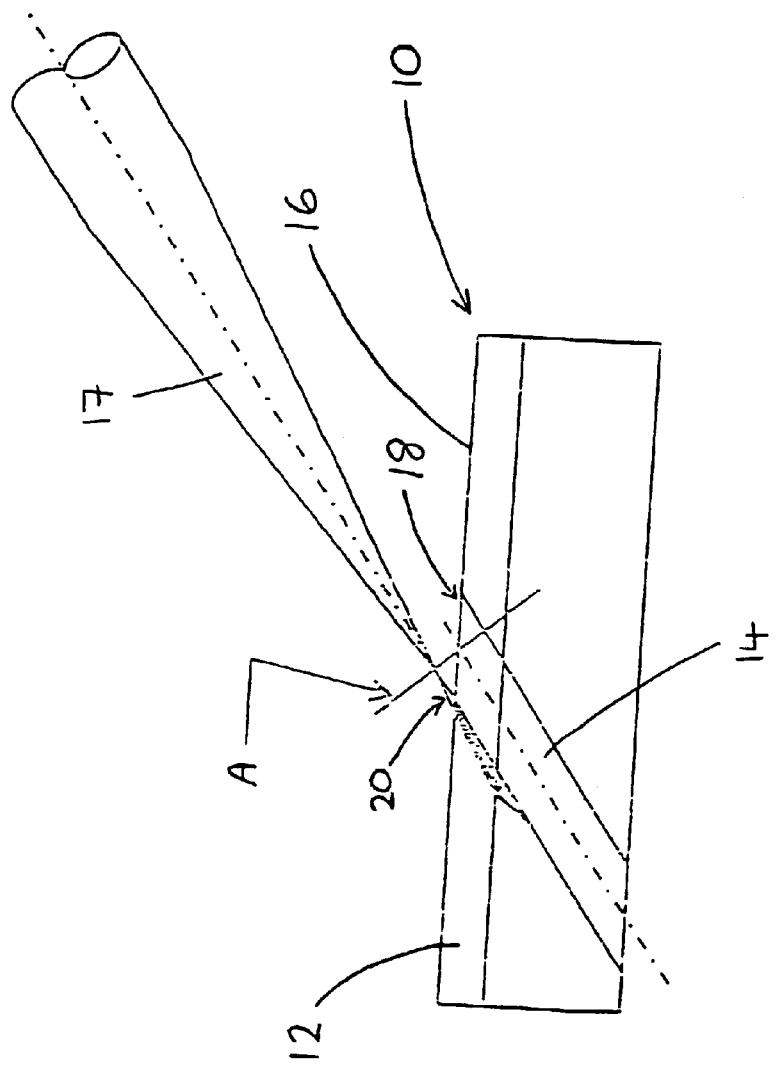
FIG. 1 is a diagrammatic illustration of a conventional method for producing angled effusion holes in components.

Referring to FIG. 1, there is illustrated a workpiece in the form of a combustor wall component 10 for a gas turbine engine. The component 10 is provided with a thermal barrier coating 12 of a highly heat resistant material. Typically the thickness of the component 10 may be between 1 mm and 2 mm, with the thermal barrier coating being about 0.5 mm in thickness, inclusive of a bond coat and a top coat.

An angled effusion hole 14 is to be drilled into the component 10, the hole 14 penetrating the wall thickness obliquely at an angle of about 35° to a surface 16 of the component 10.

A plurality of angled effusion holes may be provided in the component, such that cooling air may be passed through the holes to form a "film" on the surface of the component. This enables the component to withstand the flow of hot gases over its surface.

It is usual for effusion holes to pass obliquely through a component in order that the stream of cooling air has a component of velocity in the direction of the flow of hot turbine gases over the surface of the component. This results in a less turbulent exit of the cooling air and the production of a relatively stable film on the surface 16.

Referring again to FIG. 1, because the hole 14 lies at an angle to the surface 16 of the component, one side region 18 of the hole meets the surface 16 at an obtuse angle and an opposite side region 20 of the hole 14 meets the surface 16 at an acute angle. The side region 20 is termed the "knife edge" because a relatively thin and sharp piece of component material is formed at the edge of the hole.

The oblique effusion hole 14 is produced in the component 10 by laser trepanning, using an angled laser nozzle 17 which directs a laser beam onto the surface 16 of the component. The method involves programming a circular path for the laser nozzle on a plane A perpendicular to the axis of the laser nozzle. Movement of the nozzle causes the laser beam to be translated around the circular path and, because the circular path is angled to the surface 16 of the component 10, the entry of the hole when viewed normal to the surface, appears elliptical.

The direction and focus of the laser beam is fixed relative to the position of the nozzle, so that the laser beam may be controlled by moving the nozzle. A lens within the laser focuses the beam, the diameter of the beam at the focal point being about 0.02 mm.

Initially the laser beam is focused on a point generally in a central region of the hole to be produced, and an initial orifice is drilled. The laser beam is then translated towards a starting point on the circumference of the hole to be formed. The exact location of the starting point depends upon the shape and orientation of the component 10, but this point may be in the region of the knife edge 20 of the hole 14. After translation to the starting point, the laser beam is rotated to describe a circle focused on the plane A, as described above, in order to produce the hole in the component.

Attempts to increase the rate of laser drilling of angled effusion holes involve increasing the pulse energy of the laser, or the feed rate. The Applicants have found that this causes various problems with the above prior art method. Firstly, the thermal barrier coating may delaminate or detach from the knife edge region 20 of the laser drilled hole 14. Secondly, because the laser beam is focused on the plane A and not actually on the surface 16 of the component, this can increase the size of the mouth of the hole, (i.e., the passageway at the entrance of the hole). This is referred to as "bell-mouthing".

Figure 2:
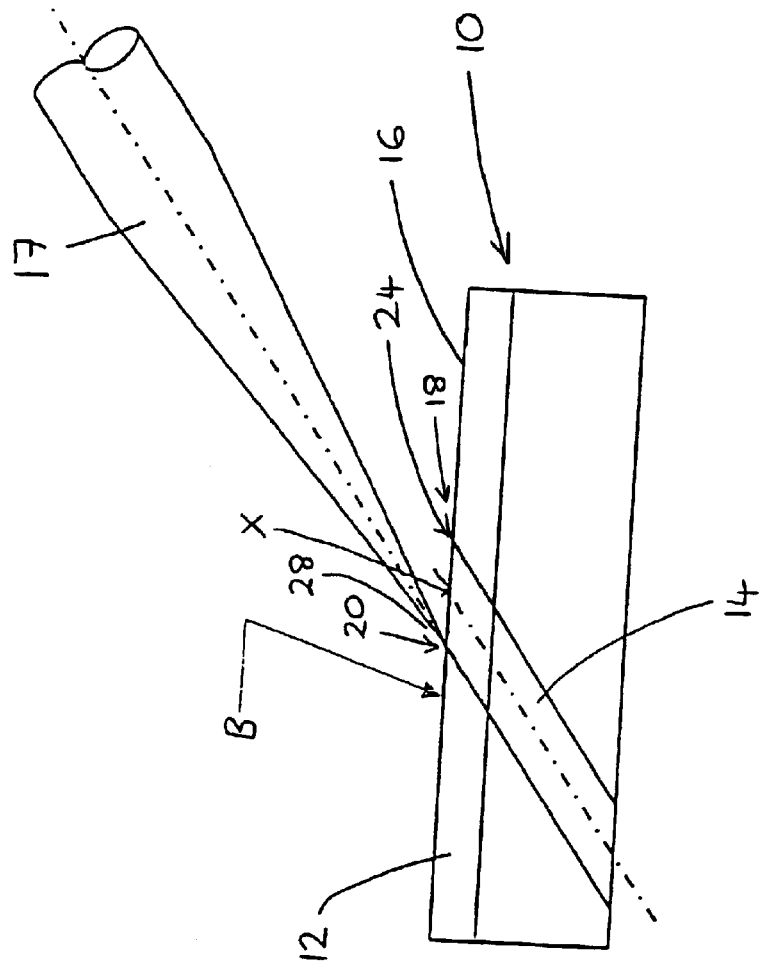
FIG. 2 is a diagrammatic illustration of a method according to the invention.
Figure 3:
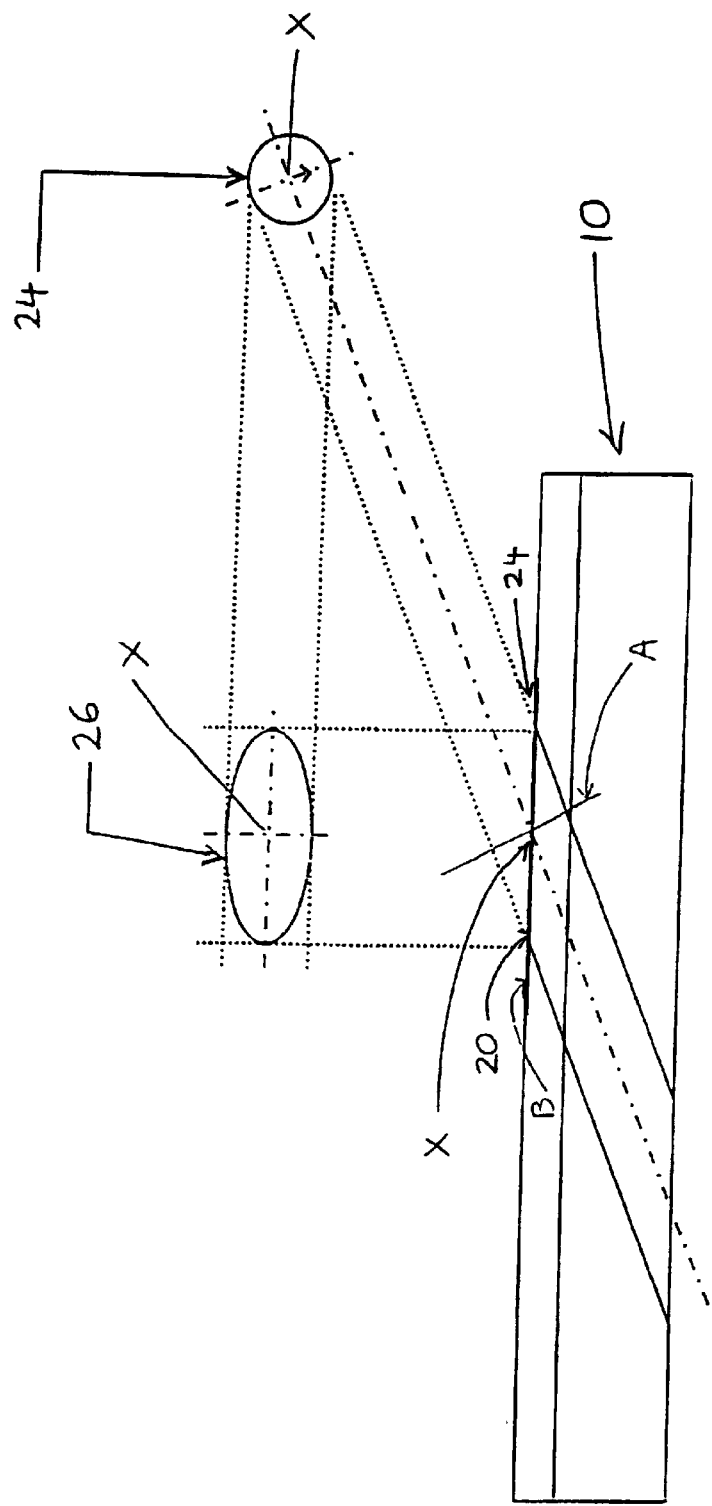
FIG. 3 is a more detailed diagrammatic illustration of the method according to the invention.

Referring to FIGS. 2 and 3, according to the method of the invention, an initial orifice is first drilled by the laser, at a position X generally in the centre of the hole to be drilled. The nozzle 17 of the laser is then adjusted to move the focus of the laser beam towards a starting point 24. This starting point is located in the side region 18 of the hole 20 to be drilled. This is the region which meets the surface 16 of the component 10 at an obtuse angle. Once the focus of the laser beam has reached the starting point 24, the nozzle 17 is moved to guide the laser beam through an elliptical path, focused on the surface 16 of the material at all times.

The position of the nozzle 17 and thus the laser beam is controlled by a CNC control unit (not illustrated). The control unit software includes a command which allocates "X", "Y" and "Z" axes to a tip 28 of the nozzle. The position of the nozzle tip may then be controlled by programming the CNC unit with "X", "Y" and "Z" "moves", representing components of movement of the nozzle tip along each of the three axes.

In order to program an ellipse as required by the method of the invention, the "X" and "Y" axes are programmed onto the plane A. Programming of appropriate "X" and "Y" moves thus enables the nozzle to describe a circle 24 on plane A. The "Z" axis is programmed onto a plane perpendicular to plane A. This allows "Z" moves also to be programmed for the laser nozzle, the "Z" moves representing the movement of the nozzle in a direction perpendicular to the plane A.

A "Z" move is programmed for each of four quadrants of the circle on plane A. For example, for a first quadrant, a "Z" co-ordinate may increase from zero to a value which depends upon the size and angle of the hole to be drilled. For a second quadrant, the "Z" co-ordinate would decrease back to zero. For the third quadrant the "Z" co-ordinate would decrease from zero to a negative value (also dependent upon the size and angle of the hole). Finally the "Z" co-ordinate for the fourth quadrant would increase back up to zero. This produces an ellipse 26 on plane B (see FIG. 3).

Using the above basic technique, any size or angle of hole may be drilled by inputting variables such as hole diameter, angle to surface, feed rate, whether the component is part of an inner or outer wall, etc. The use of the "Z" moves enables the laser beam to be focused on the surface of the component throughout the entire elliptical path. As the laser light enters the component, it is collimated by the component material and there is therefore no change in focus as it passes through the component.

There is thus provided an improved method of laser drilling angled effusion holes in components.

In the above method, once the initial orifice has been formed, the laser beam is moved towards the obtuse angled side region 18 of the hole to be drilled. There is a necessary momentary pause as the laser changes direction when it meets the circumference of the ellipse defining the periphery of the hole. Because this pause takes place in an area with plenty of component material, rather than at the knife edge region 18, it does not cause delaminating of the thermal barrier coating. Further, because the laser beam is focused on the surface 16 of the component throughout the whole of the ellipse to be traversed, the circumference of the ellipse is defined precisely and no bell mouthing occurs.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of producing an angled hole in a workpiece using a laser beam, the workpiece comprising a surface, the surface defines an angled hole, the angled hole having a first edge region and an opposite edge region, the first edge region of the angled hole meeting a surface of the workpiece at an obtuse angle and the opposite edge region of the angled hole meeting the surface of the workpiece at an acute angle, the method including the steps of:

using the laser beam to drill an initial orifice in the workpiece;

translating the laser beam away from the initial orifice to a starting point at a periphery of the hole to be produced;

and moving the laser beam such that it traces a closed loop path on the surface of the workpiece, thus defining the periphery of the hole, whilst maintaining the focus of the laser substantially on the surface of the workpiece;

wherein the starting point is located in the edge region of the angled hole which meets the surface of the workpiece at an obtuse angle.

2. A method according to claim 1 wherein the closed loop is traced so as to surround the initial orifice.

3. A method according to claim 1 wherein the closed loop path is elliptical.

4. A method according to claim 1 wherein the laser beam is angled obliquely relative to the surface of the workpiece.

5. A method according to claim 4 wherein the laser beam is oriented at substantially the same angle as the hole to be produced.

6. A method according to claim 1 wherein the laser beam is guided through a laser nozzle which is movable to control the position and/or focus of the laser beam.

7. A method according to claim 6 wherein the laser nozzle comprises a tip and a central axis, the movement of the nozzle is controlled with reference to three mutually perpendicular axes defined at the tip of the nozzle, one of the axes being parallel to the central axis of the hole to be produced and the other two axes defining a plane perpendicular to the hole to be produced, and wherein movement of the nozzle has a component consisting of a circle traced on the plane and a component consisting of variable movement along the axis perpendicular to the plane, thereby tracing an elliptical path substantially on the surface of the workpiece.

* * * * *